Aug. 31, 1937.  W. H. WOOD  2,091,425
HYDRAULICALLY OPERATED MACHINE TOOL
Filed Dec. 15, 1932  3 Sheets-Sheet 1
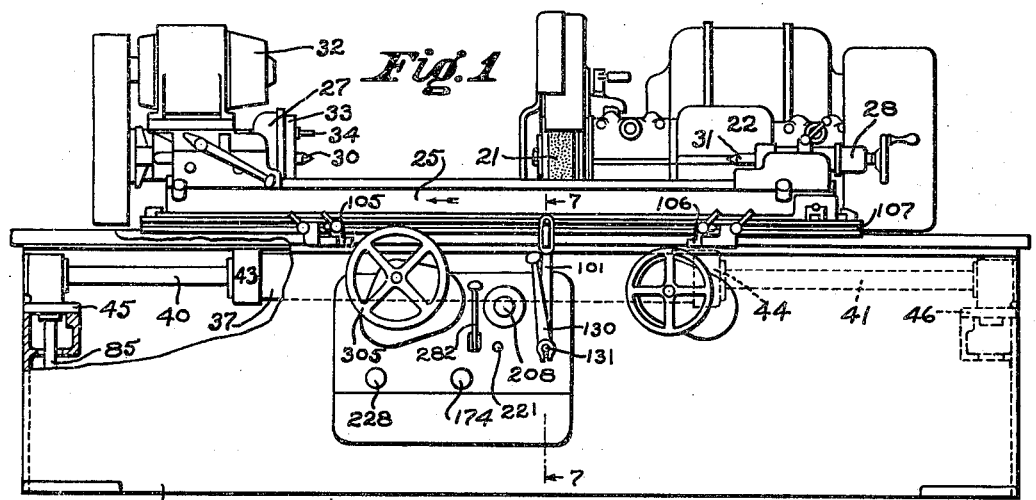
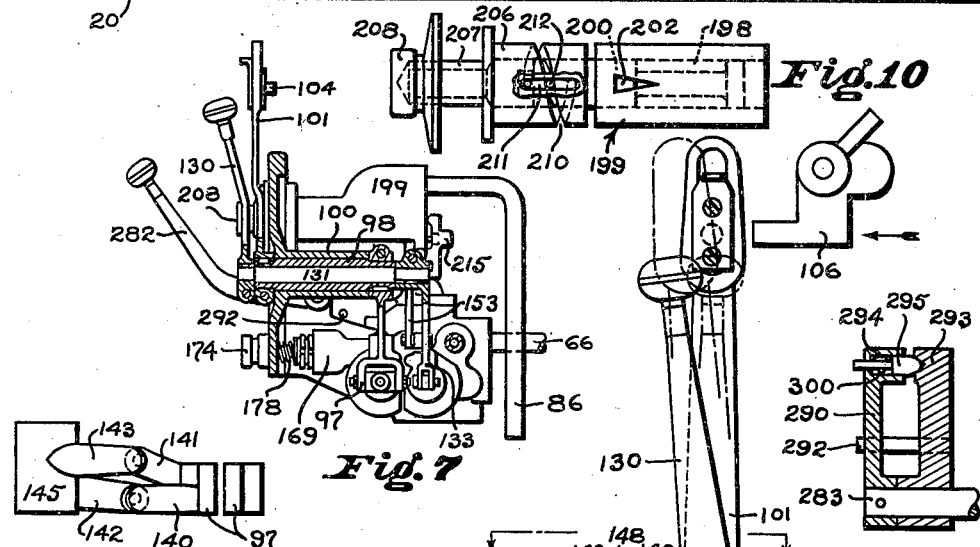
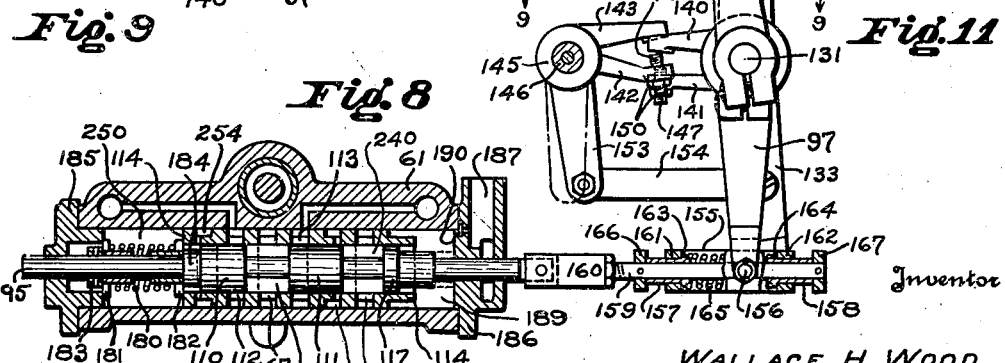
WITNESSES
Franklin E. Johnson
Edward H. Goodrich
Inventor
WALLACE H. WOOD
By Clayton L. Jenks
Attorney Aug. 31, 1937.   W. H. WOOD   2,091,425
HYDRAULICALLY OPERATED MACHINE TOOL
Filed Dec. 15, 1932   3 Sheets-Sheet 3
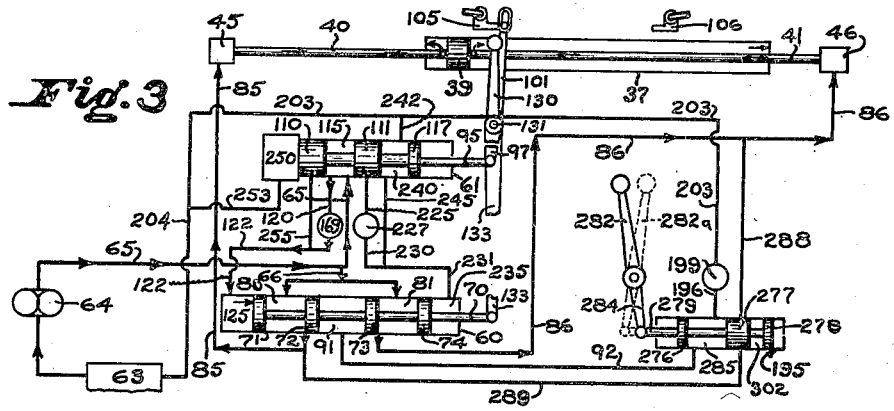
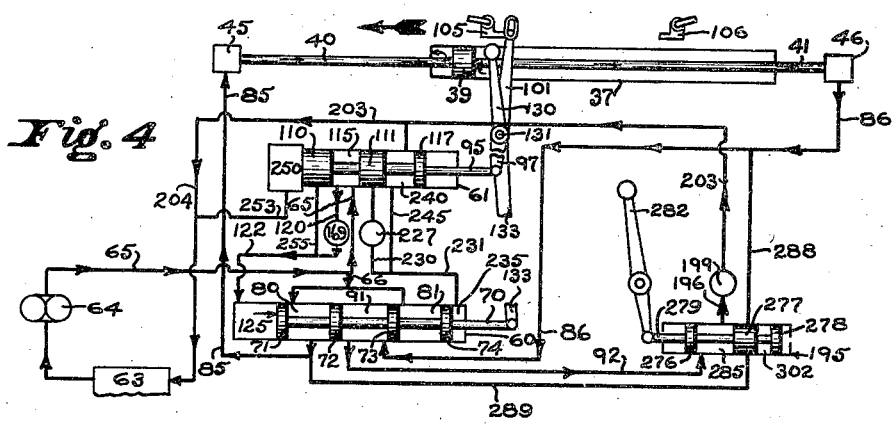
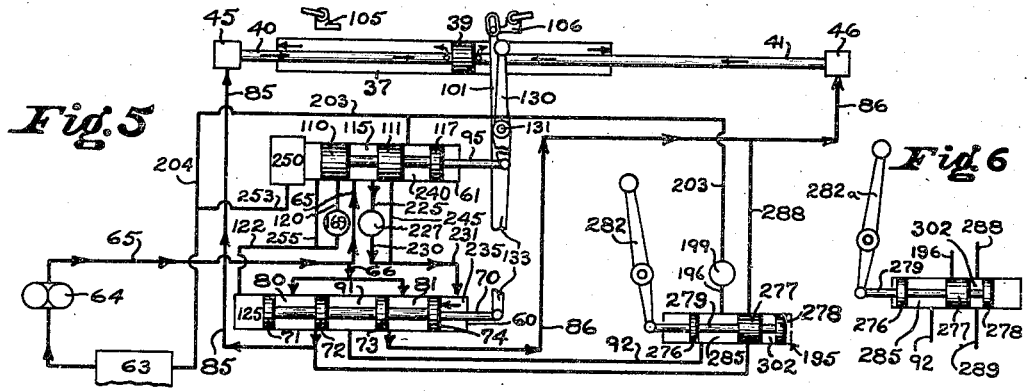
Inventor
WALLACE H. WOOD
WITNESSES
Franklin E. Johnson
Edward H. Goodrich
By Clayton L. Jenks
Attorney Patented Aug. 31, 1937

2,091,425

UNITED STATES PATENT OFFICE 2,091,425

HYDRAULICALLY OPERATED MACHINE TOOL

Wallace H. Wood, Worcester, Mass., assignor to Norton Company, Worcester, Mass., a corporation of Massachusetts Application December 15, 1932, Serial No. 647,311

12 Claims. (Cl. 51—233)

This invention relates to hydraulically operated machine tools, such as grinding machines, and more particularly to a table traversing mechanism therefor.

Heretofore various machine tools have been provided with fluid pressure actuated table traverse mechanisms adapted to reciprocate a work piece while in engagement with a cutting tool and to thereby cause a continued rapid cutting operation upon the work. These prior machines have, due to their constructions, often been subjected to shocks and jars at time of reversal and have usually employed an additional separate table traverse mechanism which could be manually actuated by means of a hand wheel or other suitable device. In these prior constructions, it has been found impractical to change from the automatic fluid pressure table traverse to the manually operated table traverse without first disengaging the fluid pressure mechanism and removing the fluid pressure from the table operating device. Such a construction has tended to cause air pockets to form in the fluid pressure system and has often resulted in uneven and inaccurate table reciprocation, thereby spoiling the work which must be smoothly reciprocated during the cutting operation thereon.

It is accordingly the primary object of my invention to provide an automatically operated table reciprocating mechanism wherein the table may be smoothly brought to a stop and started again at the time of its reversal without any shocks, jars or uneven table movement.

A further object of this invention is to provide a fluid pressure actuated table traverse mechanism for machine tools, wherein the table may be stopped at any time during its reciprocation and manually traversed without disconnecting the fluid pressure system from the table actuating mechanism.

In prior hydraulically operated table traverse mechanisms, it has been the usual practice to provide a relatively reciprocable piston and cylinder device connected to a reversing valve which stops the table movement at time of reversal by pocketing fluid in the cylinder on opposite sides of the piston under a zero pressure. Since the fluid is pocketed, there can be no relative piston and cylinder movement, and as a consequence no table traverse at this time. When the reversing valve in such a construction is shifted to a table traverse position, one end of the cylinder is suddenly opened to full fluid pressure while the other end of the cylinder is opened to the exhaust. This sudden increase in pressure usually causes the table movement to start with uneven shocks and jars.

It is, therefore, a still further object of this invention to provide a machine tool having a fluid pressure actuated table reciprocating mechanism wherein the table may be caused to evenly start traversing due to a reduction of one of two balanced fluid pressures within the table reciprocating mechanism.

Other objects will be apparent from the foregoing disclosure. One embodiment of this invention has been illustrated in the accompanying drawings, in which like reference numerals indicate like parts:

Fig. 1 is a front elevation of a grinding machine embodying this invention;

Fig. 2 is a diagrammatic view of the valve mechanism showing a table dog contacting with the pilot valve lever preparatory to stopping the table movement when the table is traversing towards the right;

Fig. 3 is a diagrammatic view showing the relative positions of the valve mechanism and table when the table movement towards the right has been automatically stopped;

Fig. 4 is a diagrammatic view showing the relative positions of the valve mechanism and table when table reversal is completed and the table is just starting to move toward the left;

Fig. 5 is a diagrammatic view showing the positions of the valve mechanism and table when the table has completed its movement towards the left and just prior to its reversal;

Fig. 6 is a diagrammatic view showing the piston locations of the by-pass valve when shifted to a position to by-pass fluid;

Fig. 7 is a sectional view taken approximately on the line 7—7 of Fig. 1;

Fig. 8 is a fragmentary view showing the relative positions of the control levers and pilot valve while the table is moving towards the left;

Fig. 9 is a fragmentary view taken along the line 9—9 of Fig. 8;

Fig. 10 is a fragmentary view showing the speed control valve; and

Fig. 11 is a fragmentary view showing the mechanism employed to locate the by-pass valve in either operative position.

The specific embodiment of this invention, as illustrated in the drawings, comprises a grinding machine having a fluid pressure operated table reciprocating mechanism so arranged that the table may be traversed in both directions at any desired rate of speed and caused to dwell at the termination of each reciprocatory stroke for a predetermined but variable period of time. The table reciprocating mechanism includes a table actuating motor, a reversing valve, a pilot valve and a by-pass valve. Dogs adjustably positioned on the table serve to shift the reversing valve to a neutral position which first stops the table traverse at each end of a predetermined reciprocatory stroke and then applies balanced fluid pressures within the table actuating motor. At the same time that the reversing valve is shifted to a neutral position, the pivot valve is automatically shifted and admits a controlled amount of fluid under pressure into one end of the reversing valve at a regulated rate, thereby serving to shift the reversing valve into an operative position which gradually unbalances the fluid pressures in the table motor and starts the table evenly traversing without shocks or jars in an opposite direction after a predetermined but adjustable dwell period. A manually operable by-pass valve is also provided whereby fluid may be passed around the table actuating mechanism at any time and stop the movement of the table under the influence of fluid pressure whenever desired without disconnecting the fluid pressure mechanism from the table. When this by-pass valve is in an operative position, the table may be traversed manually by any suitable mechanism, irrespective of the positions of other valves in the fluid pressure system.

As illustrated in the drawings, this machine comprises a base 20 supporting a rotatable grinding wheel 21 on a wheel slide 22, which is arranged for movement transversely of the base. The base is also provided with a work supporting table 25 slidably mounted for longitudinal movement thereon. The work table 25 is provided with a headstock 27 and a footstock 28 which may be adjustably positioned in any well-known manner to rotatably support a work piece upon the respective centers 30 and 31. The work may be rotated by any convenient means which in the present instance comprises a motor 32 mounted on the headstock 27 and connected to rotate a face plate 33 having a work driving dog 34 secured thereto.

The table 25 may be reciprocated by a fluid pressure actuated device, which is so arranged that the table is caused to dwell in its movement for short, predetermined but variable periods at both ends of the table reciprocation. This mechanism may comprise a relatively reciprocable, fluid pressure actuated piston and cylinder connected between the base 20 and the table 25 to control the movement of the table. As illustrated in the drawings, the cylinder 37 is secured to the under side of the table 25 and arranged for movement therewith. A piston 39 having two opposed faces of equal pressure areas is slidably mounted within the cylinder 37 and maintained in a fixed position relative to the base by means of two connecting rods 40 and 41 secured thereto. The piston 39 is preferably formed as two separate spaced pistons which are rigidly connected to the ends of hollow piston rods 40 and 41 respectively. These connecting rods are slidable through the cylinder heads 43 and 44 fixed to the ends of cylinder 37 and are secured at their outer ends to the brackets 45 and 46 which are fastened to the machine base 20. The brackets 45 and 46 are provided with chambers 48 and 49 arranged to communicate with passages 51 and 52 within the piston rods 40 and 41 respectively. The hollow rods 40 and 41 are further provided with ports 53 and 54 communicating with the passages 51 and 52 respectively, which are located adjacent to the ends of the piston 39, whereby fluid may enter or leave each end of cylinder 37. It will thus be apparent that fluid under pressure may communicate with either chamber 48 or 49 from any suitable source to cause a controlled table movement. For example, fluid under pressure may enter chamber 48, pass through passage 51 and port 53 into the left-hand end of cylinder 37, causing a movement of the table toward the left. At this time, fluid may flow from the right-hand end of the cylinder 37 out through port 54, passage 52 and chamber 49 to a suitable exhaust. The ports 53 and 54 are elongated and V-shaped adjacent to the piston 39. This construction prevents a shock stop of the table if the cylinder is permitted to travel its greatest possible stroke, since the exhaust port 53 or 54 through which fluid flows back into the supply tank may be gradually throttled by the cylinder head partially covering said port.

To reverse the direction of the table movement, the fluid pressure system is provided with a reversing valve 60 connected to both ends of the cylinder 37 through the respective chambers 48 and 49. A pilot valve 61 is further provided and arranged to shift the reversing valve 60 and thereby change the direction of fluid flow to the chambers 48 and 49 and cylinder 37. In the base of the machine, a fluid supply reservoir 63 is provided, and fluid is pumped therefrom under pressure by a suitable pump, such as a gear pump 64. Fluid under pressure flows from the pump 64 through pipes 65 and 66 which communicate respectively with port 67 of the pilot valve 61 and ports 68 and 69 of the reversing valve.

The reversing valve 60 is provided with a valve stem 70 having pistons 71, 72, 73, and 74 mounted thereon and slidable within a cylinder sleeve 75 which contains the valve ports 68 and 69 and is fixedly positioned between cylinder heads 76 and 77 of the reversing valve. The valve ports 68 and 69 connect with chambers 80 and 81 which lie respectively between valve pistons 71 and 72, and 73 and 74. Sleeve 75 is also provided with ports 82 and 83, communicating respectively through pipes 85 and 86 with chambers 48 and 49 and cylinder 37. Sleeve 75 is further provided with a port 90 which is in continuous communication with chamber 91 between the valve pistons 72 and 73 and also with a pipe 92 which may connect through a suitable exhaust system with the supply reservoir 63.

The reversing valve stem 70 and pistons 71, 72, 73, and 74 thereon may be shifted to change the direction of table travel by means of suitable mechanism. In the preferred embodiment of this invention, the movement of the table serves to actuate the valve stem 70 and shift the reversing valve to a neutral position when the table has reached a predetermined position, thereby automatically stopping table movement. The pilot valve 61 is also actuated by the table at this time and it serves to further shift the reversing valve pistons to an operative position and start the table moving in the opposite direction after a predetermined period of dwell. The pilot valve 61 is provided with a valve stem 95 connected to a lever 97 fixed to and depending from the inner end of a sleeve 98 (Fig. 7) journalled within a bearing 100 secured to the front of the base 20. The outer end of the sleeve 98 is provided with an upstanding lever 101 fixed thereto, so that any angular movement thereof will cause a corresponding angular movement of depending lever 97. The upper end of the lever 101 is provided with a pin 104 arranged to be engaged by adjustable dogs 105 and 106 depending from the table and adjustably positioned within a T-slot 107 cut in the forward side of the table 25.

During the normal travel of the table, the pilot valve is maintained in a neutral position, as shown in Fig. 2; that is, with the pilot valve pistons 110 and 111 positioned to cover the ports 112 and 113 respectively, which lie within a valve sleeve 114 and communicate with the reversing valve. When the pilot valve is in this neutral position, fluid under pressure from the pump 64 may enter a chamber 115 between pistons 110 and 111, but it cannot flow from the pilot valve to the reversing valve, since ports 112 and 113 are closed, as shown in Fig. 2.

Assuming the table to be traversing toward the right, as shown in Fig. 2, the valve pistons will remain in the position there shown until the table dog 105 engages the pin 104 and rocks the lever 101 towards the right to the position shown in Fig. 3. This movement shifts the valve stem 95 so that pilot valve pistons 110, 111, and 117 move towards the left and assume the positions illustrated in Fig. 3. Movement of the pilot valve pistons to these positions opens the port 112 to admit fluid under pressure from chamber 115 through port 112, pipes 120 and 122 into the port 123 and chamber 125 at the left-hand end of the reversing valve 60 between piston 71 and cylinder head 76. This permits the fluid pressure within the system to pass back of the reversing valve piston 71 on valve stem 70 and shift the reversing valve pistons towards the right to the position shown in Fig. 4, causing a reversal of the table movement.

One feature of this invention involves provisions whereby the reversing valve may be automatically shifted to a neutral position by the table itself to stop the table movement when it has reached a predetermined position, and a definite period of dwell may also be provided at each end of the table reciprocation. To accomplish this, a suitable lever mechanism is so arranged that it will be actuated in timed relation with the lever 97 which controls the movement of the pilot valve 61. This may comprise a manually operable lever 130 fixed to the forward end of a shaft 131 which is journaled within sleeve 98, as shown in Fig. 7. The other end of shaft 131 is provided with a lever 133 affixed thereto and depending therefrom, said lever being connected to operate the reversing valve stem 70 through an adjustable connecting link 134. As illustrated in Figs. 7, 8, and 9, the levers 97 and 133 are connected through a lost motion linkage so that when one of the table dogs moves lever 101 to such a position as to open the pilot valve, the reversing valve is automatically shifted to a neutral position to stop the table movement. The upper end of lever 97 is provided with two outwardly projecting portions or fingers 140 and 141 which are respectively engageable with two projecting arms 142 and 143 of a bell crank 145 journaled on a pin 146 supported on the machine base. The arms 141 and 142 are provided with studs 147 and 148 screwed therein and locked in position by lock nuts 150 so that the amount of lost motion between the respective arms may be regulated. Bell crank 145 is further provided with a depending arm 153 which is connected to move the lever 133 through a cooperating link 154 pivotally connected between said depending arm and lever.

As the table traverses toward the right, as shown in Fig. 2, the dog 105 engages lever 101, which is normally maintained in a vertical position, and moves it towards the right to the position shown in Fig. 3. This movement of lever 101 rocks lever 97 through a corresponding angle and thereby lifts the projecting finger 141 which after the required extent of lost motion engages bell crank arm 143, thereby rocking bell crank 145 and moving the reverse valve to a neutral position (Fig. 3) through depending arm 153, link 154 and lever 133.

To prevent possible injury to the machine caused by an incorrect adjustment of the lost motion device, a compensating mechanism is provided, as shown in Fig. 8. This may comprise a double head yoke member 155 pivotally connected by pins 156 to the lower end of lever 97 for swinging movement therewith and slidably mounted upon sleeves 157 and 158 which are slidably mounted upon a rod 159 passing through the yoke member and connecting with piston rod 95 through an adjustable link 160. The ends of member 155 are provided with reduced portions 161 and 162, which are slidably journaled upon the respective sleeves 157 and 158 and engageable with heads 163 and 164 on the inner ends of said sleeves. A coil spring 165 surrounding the rod 159 is compressed between the heads 163 and 164 and normally holds said heads in engagement with the respective reduced portions 161 and 162 of member 155. The maximum extent of movement of sleeves 157 and 158 may be limited by collars 166 and 167 affixed to the rod 159. The collars 166 and 167 are so located with relation to each other that the spring 165 is under sufficient compression to normally transmit the movement of lever 97 directly to rod 159 without further compression of said spring and thereby cause a corresponding movement of the pilot valve stem 95. However, if the lost motion device is incorrectly adjusted so that the movement of lever 97 tends to force the pilot valve beyond its maximum possible travel, spring 165 will be further compressed and permit a relative sliding movement between member 155, sleeves 157 and 158 and rod 159, thereby preventing damage to the machine.

To prevent shocks in stopping the table when it is being traversed in either direction by fluid pressure, the reversing valve ports 82 and 83 communicating with the opposite ends of the table cylinder have been so located that as the lever 133 moves the reversing valve pistons into a neutral position, one of said ports 82 or 83 is momentarily closed by one of the valve pistons, thereby pocketing fluid in one end of the table cylinder 37 and stopping the table traverse. Immediately thereafter, when the pistons reach their neutral position, as shown in dotted lines in Fig. 2, the pistons 72 and 73 are so positioned that they do not completely cover the ports 82 and 83, thereby directing full fluid pressure through said ports into both ends of the table cylinder. The opposite faces of piston 39 within the table cylinder have equal areas. Hence, it will be appreciated that when fluid is pocketed in one end of cylinder 37, and the other end of the cylinder is still open to full fluid pressure, the pocketed fluid will be compressed until the pressures against the opposed piston faces of piston 39 will be balanced, serving to bring the table to a cushioned positive stop. Continued movement of the reversing valve pistons to a neutral position, as shown by the dotted line piston positions in Fig. 2, does not alter the conditions within the cylinder 37, but transfers full fluid pressure from the pump 64 to both ends of the cylinder 37, maintaining the balanced pressures against the opposed faces of piston 39 even when there is a leakage of fluid through the piston rod bearings in cylinder heads 43 and 44. Excess fluid pressure will not tend to build up with the fluid system at this time, since it may be relieved by any well-known type of relief valve 167 and passed back into the supply tank 63 through a pipe 168.

A table traverse control, as provided by this invention, has been found to be very smooth, accurate and positive in its operation. In repeated tests of this machine, the table traverse has been brought to a smooth positive stop with variations of not over two ten-thousandths of an inch, thereby providing an automatically controlled table traverse mechanism which is admirably suited to finishing a work surface close to a shoulder.

In order that the period of table dwell may be varied at the right-hand end of the table stroke, a suitable valve 169 is interposed between the pipes 120 and 122 which connect the pilot valve 61 to the reverse valve 60. This dwell control valve may comprise any type of valve adapted to regulate the rate of fluid flow from the pilot valve to the reversing valve; but as illustrated in Fig. 2, it preferably comprises a cylinder 170 provided with an intake port 171 and an exhaust port 172. A piston 173 is slidably mounted within cylinder 170 and arranged to vary the extent of closure of port 171 by regulated amounts controlled by a manually operable knob 174 projecting out through the front of the machine. The knob 174 is connected to the piston 173 by means of a rod 175 having an enlarged portion 176 threaded into a bearing member 177 secured to the outer end of the valve casing. A spring 178 is provided to prevent the knob from being turned too easily. It will thus be seen that by turning the knob 174, the rate of flow of fluid from the pilot valve to the reversing valve may be accurately regulated, and the time required to shift the reversing valve from a neutral position (Fig. 3) to an operative reverse position as shown in Fig. 4 may be controlled, thereby providing any desired period of dwell. For convenience of the operator, the knob 174 may be provided with graduations 179 which may be aligned with an index point on the base of the machine, whereby various known periods of dwell may be quickly attained.

One important feature of this invention resides in the fact that the start of table movement at time of reversal of the reversing valve is caused by a reduction of the fluid pressure at one end of the table traverse cylinder. Since the full operating pressure of the fluid pressure system is maintained in a balanced relation against the opposed equal area faces of piston 39 when the reversing valve is in a neutral position, it will be appreciated that any movement of the reversing valve to an operative position at this time will gradually connect one side of the table cylinder to the exhaust system and reduce the fluid pressure against one side of piston 39, causing a differential of pressures to gradually start the table smoothly traversing without subjecting it to any of the shocks and jars which are present in the operation of many of the prior types of table traverse mechanisms.

After reversal of the table has taken place, the pilot valve stem 95 is automatically returned to a neutral position, wherein the ports 112 and 113 are both covered by pistons 110 and 111 respectively, as shown in Fig. 2. This is accomplished by means of a coil spring 180 interposed between two collars 181 and 182 which are slidably mounted on valve stem 95 and respectively engageable with collars 183 and 184 affixed to said valve stem, as shown in Figs. 2 and 8. When the pilot valve is in a neutral position, the collars 181 and 182 engage shoulders on the pilot valve head 185 and the end of the valve sleeve 114 within the valve casing 61, thereby limiting further movement of collars 181 and 182 against the shaft collars 183 and 184. The pilot valve pistons remain in the positions shown in Fig. 4 until the table moves in the reverse direction, towards the left. As soon as the table starts moving toward the left, the table dog 105 withdraws from the pin 104, and the released pressure of spring 180 acts against collars 183 and 184 to return the valve stem 95 and pistons thereon to a neutral position, as illustrated in Fig. 2.

In order to give sufficient time for shifting the reversing valve 60, the return movement of the pilot valve stem 95 and pistons thereon to a neutral position is retarded so that port 82 of the reversing valve 60 is completely opened before the pilot valve is returned to a neutral position. To accomplish this, pilot valve head 186 at the right-hand end of the pilot valve is provided with a chamber 187 communicating with a chamber 189 in the pilot valve between piston 117 and valve head 186 by means of a small port 190. Chamber 187 may be supplied with fluid from any suitable source, as by a pipe 191 and valve 192 connected to the fluid pressure system. It will thus be noted that when the pilot valve is shifted, chamber 189 will serve as a dash pot, and the rate of return movement of the pilot valve to a neutral position will be controlled by the rate of fluid flow through port 190.

During the movement of the table toward the left, as indicated in Fig. 4, fluid under pressure passes from pump 64, through pipes 65 and 66, into the reversing valve through port 68, chamber 80, and therefrom through port 82, pipe 85, chamber 48, passage 51, and into the left-hand end of table cylinder 37 through port 53. At this time, fluid may exhaust from the right-hand end of cylinder 37 through port 54, passage 52, chamber 49, pipe 86, into reverse valve chamber 91, through port 83, and then out through port 90, pipe 92, through a by-pass valve 195, pipe 196, into a chamber 198 in a speed control valve 199. This speed control valve, as illustrated, is of the balanced piston type and is provided with a piston 200, arranged to be moved within the valve 199 and thereby control the closure of an elongated V-shaped port 202 (Fig. 10) communicating through pipes 203 and 204 with the fluid supply tank 63.

The closure of V-shaped port 202 may be manually controlled from the front of the machine to regulate the rate of reciprocation of table 25. To accomplish this, the piston 200 is surrounded by a sleeve member 206 provided with a reduced portion 207, projecting through the front of the machine and having a control knob 208 secured thereto, as shown in Fig. 10. Sleeve 206 is provided with a helical slot 210, and the valve body 199 is provided with a longitudinal slot 211 cut axially of said piston and sleeve. A pin 212 projects radially from piston 200 and passes through both of said slots. It will thus be apparent that any angular movement of knob 208 will serve to rotate sleeve 206 and cause pin 212 to move longitudinally of slot 211, thereby moving piston 200 to close or open the V-shaped port 202 and control the fluid flow therethrough in its return to tank 63. For convenience of adjustment, the knob 208 may be provided with a scale of graduations aligned with an index mark on the machine.

The speed control valve may also be so adjusted that the rotation of knob 208 may not reduce table movement below a preadjusted minimum table speed. To accomplish this, piston 200 is provided with a piston rod engageable with the arm 214 of a bell crank lever 215 pivoted on valve casing 199. A depending arm 217 of bell crank 215 is engaged by a rod 220 screw threaded within the base and provided with a head 221 projecting through the front of the machine. A spring 222 serves to maintain bell crank arm 217 and rod 220 in engagement. It will be apparent that by turning screw head 221, the position of bell crank arm 214 is regulated and knob 208 cannot move piston 200 and the piston rod beyond this locating position, thereby limiting the extent of closure of port 202. This feature is particularly useful, since it is often desired to rapidly traverse the table and shortly thereafter to reduce the table movement to a slow preadjusted speed.

Movement of the table toward the left, as indicated in Fig. 4, continues until the table dog 106 engages pin 104 and rocks lever 101 towards the left-hand position, as shown in Fig. 5. When lever 101 is shifted towards the left, as shown in Fig. 5, lever 97 is moved through a corresponding angle and finger 140 is moved downward, engaging bell crank arm 142 after the required extent of lost motion. Movement of bell crank arm 142 is transmitted through the depending arm 153 and link 154 to shift lever 133 to such a position as to bring the reverse valve to a neutral position, as shown in Fig. 3, to stop the table movement and apply balanced fluid pressures to both ends of the table cylinder. Movement of lever 101 to this left-hand position acts through sleeve 98 and lever 97 to shift the pilot valve from a neutral position (Fig. 2) to the position shown in Fig. 5, wherein fluid may flow under pressure from pump 64 through pipe 65 and port 67 into chamber 115 and out through port 113, through pipe 225 and into a dwell control valve 227 arranged to control the dwell at the left-hand end of the table stroke, and which is of the same construction as dwell control valve 169. Dwell control valve 227 may be regulated by a knob 228 on the front of the machine. Fluid flows from the dwell control valve 227, out through pipes 230 and 231 and through a port 234 into a chamber 235 in the right-hand end of reverse valve between piston 74 and valve head 77, acting to shift the reverse valve from a neutral position, as shown in Fig. 3, to the position shown in Fig. 2 and start the table movement toward the right. The extent of table dwell during reversal upon completion of the table stroke toward the left is dependent upon the adjustment of the dwell control valve 227, which may be regulated by knob 228 in an identical manner to the adjustment of dwell control valve 169.

In order to give ample time for shifting the reversing valve 60, the return movement of the pilot valve 61 from the position shown in Fig. 5 to the neutral position, as shown in Fig. 2, which is caused by spring 180, is delayed by the flow of fluid from the dash pot chamber 187 through port 190 into chamber 189.

Upon completion of the movement of the reversing valve pistons to the position as shown in Fig. 2, the table movement is started toward the right and fluid may now flow under pressure from pump 64 through pipes 65 and 66, and through port 69 into reverse valve chamber 81, from which fluid flow will be directed through port 83, pipe 86, chamber 49, passage 52 and port 54 into the right-hand end of cylinder 37, causing table movement toward the right. At this time, fluid may exhaust from table cylinder 37 out through port 53, passage 51, chamber 48, pipe 85 and port 82 into the reverse valve chamber 91, from which fluid will flow through port 90, pipe 92, by-pass valve 195, pipe 196, speed control valve 199, and pipes 203 and 204 back to supply tank 63.

When the reversing valve is shifted toward the right, as occurs during the reversal of the table at the termination of its stroke toward the right, fluid within reverse valve chamber 235 is free to flow into the exhaust system. This is accomplished by a pilot valve chamber 240 between the pilot valve pistons 111 and 117, opening communication between a port 241 communicating with the exhaust system through a pipe 242, and a port 244 connected with a pipe 245 joining pipe 231, said communication being effected only when the pilot valve pistons are shifted to a position to cause the reverse valve to move toward the right, as shown in Fig. 3. It will be apparent that the exhaust fluid is free to flow at this time from chamber 235 through pipes 231 and 245 and port 244 into pilot valve chamber 240 and then back to the supply tank through port 241 and pipes 242, 203 and 204.

When the reversing valve 60 is shifted toward the left, as occurs during reversal of the table at the termination of its stroke toward the left, fluid within reverse valve chamber 125 is free to flow into the exhaust system. This is accomplished by a chamber 250 at the left-hand end of the pilot valve between piston 110 and valve head 185, opening communication between a port 251 connecting with the exhaust system through a pipe 253, and a port 254 connected with a pipe 255 joining pipe 122, said communication being effected only when the pilot valve is shifted to a position to move the reverse valve toward the left, as shown in Fig. 5.

It is often desirable to stop the reciprocation of the table and traverse it by a manually operated mechanism. To accomplish this, a by-pass valve 195 has been provided whereby fluid may be by-passed from one end of cylinder 37 to the other at any time without disconnecting the fluid pressure system from the table or stopping the pump 64. The by-pass valve 195 is provided with a cylinder 275 having pistons 276, 277 and 278 slidably mounted therein and connected by a piston rod 279 which may be axially moved to various positions by any convenient means, such as a lever 282 pivotally mounted on a pin 283 and provided with a depending portion 284 engaging rod 279. During the normal operation of the machine when the table 27 is being reciprocated by fluid pressure, a chamber 285 in the by-pass valve located between pistons 276 and 277 offers communication between exhaust pipes 92 and 196, whereby fluid may exhaust through speed control valve 199, pipes 203 and 204 back to the supply tank 63. The valve cylinder 275 is further provided with two ports 286 and 287 which communicate respectively through pipes 288 and 289 with pipes 86 and 85 leading to the ends of cylinder 37.

As shown in Figs. 2 and 11, the lever 282 has two locating positions to maintain the by-pass valve pistons 276, 277 and 278 in either of their correct operative positions. To accomplish this, the lever 282 is provided with an arm 290 which is limited in its angular movement by two studs 291 and 292 which are secured to a plate 293 affixed to the machine base. The end of arm 290 is provided with a recessed portion 294 within which a plunger 295 is slidably mounted and constantly urged into engagement with the face of plate 293 by means of a spring 300. To assist in locating the lever 282 in the correct angular positions, the end of plunger 295 which engages plate 293 is rounded and engageable with two recessed portions in the plate 293, as shown in Fig. 11. It will thus be seen that when lever 282 is shifted to position 282a, indicated by dotted lines, arm 284 will be moved to position 284a, and the pistons will be moved to the left to such a position that piston 277 closes the admission of fluid into exhaust pipe 196 and uncovers ports 286 and 287 whereby fluid is free to communicate through valve chamber 302 and pipes 289, 288, 85 and 86 with both ends of cylinder 37, as shown in Fig. 6. The table 25 may be manually traversed by any suitable mechanism which in the present instance may comprise a rack and pinion device (not shown) operated by a hand wheel 305 mounted on the front of the machine. The rack and pinion device may be of any suitable construction such as, for example, that shown in the patent to C. H. Norton No. 1,563,310.

When it is desired to stop the fluid pressure actuated movement of the table, it is simply necessary to shift lever 282 to position 282a, whereupon the fluid may flow from one end of cylinder 37 to the other through by-pass valve chamber 302, and the exhaust of fluid through pipe 196 from the table cylinder is cut off by piston 277. At this time, the table may be manually traversed by turning hand wheel 305. Since fluid may not exhaust from the system at this time, and since fluid pressure to the table is not cut off, there is no opportunity for fluid to drain out of cylinder 37, leaving air pockets or low pressure areas therein, and a smooth operation of the table 25 is assured.

Having thus described my invention, what I claim as new and desire to secure by Letters Patent is:

1. A machine tool comprising a reciprocable work table, a fluid pressure actuated motor arranged to reciprocate the table, a reversing valve arranged to direct said reciprocation, a piston within the motor having two opposed operative faces of equal pressure areas, means to apply balanced fluid pressures against the opposed piston faces at any time irrespective of the reversing valve position and prevent movement of the table when desired, and means to reduce one of said balanced pressures while maintaining the other and cause a traverse of the table.

2. A machine tool comprising a reciprocable work supporting table, a fluid pressure actuated motor operatively connected to reciprocate the table, a piston within the motor having two opposed operative faces of equal pressure areas, a fluid pressure source, and manually operable means to traverse the table at any time independently of the motor while maintaining normal operating fluid pressures directed from the fluid pressure system against both of the opposed piston faces.

3. A machine tool comprising a reciprocable work table, a fluid pressure system including a fluid pressure operated motor connected to reciprocate the table, means including a reverse valve to control the extent and direction of table movement, manually operable means to traverse the table independently of the motor, and a separate manually operable device connected within the fluid pressure system which maintains the fluid under operating pressure in said system connected to the motor when the table is traversed manually.

4. A machine tool comprising a reciprocable work table, a fluid pressure system including a fluid pressure operated motor connected to move the table, said motor having a cylinder and piston means in the cylinder, a control valve arranged to direct fluid flow under pressure to either side of said piston means, manually operable table traverse mechanism, and a separate manually operable means for by-passing the fluid from one side of the piston means to the other at any time, irrespective of the position of said control valve.

5. A machine tool comprising a reciprocable work table, a fluid pressure actuated motor arranged to reciprocate the table, a piston within the motor having two opposed operative faces of equal pressure areas, a reversing valve connected to reverse the flow of fluid under pressure to and from said motor to cause a table reciprocation, and means operable at any time to direct balanced fluid pressures simultaneously to both of the opposed faces of the motor piston and cause the table to be brought quickly to a smooth stop without affecting the position of the reversing valve.

6. A machine tool comprising a reciprocable work table, a fluid pressure system including a fluid pressure operated motor connected to traverse the table, a reversing valve arranged to control the direction of fluid flow to said motor and thereby regulate the direction of table movement, dogs adjustably positioned on the table, valve controlling means engageable by said dogs and connected with the reversing valve to stop the table movement when it reaches predetermined positions, manually operable mechanism arranged to traverse the table independently of the fluid motor, and a separate manually controlled device for by-passing the fluid under full operating pressure from one side of said motor to the other at any time so that the table may be manually traversed without disconnecting the operating fluid pressure therefrom.

7. A machine tool comprising a reciprocable work table, a fluid pressure actuated motor operatively connected to reciprocate the table, a pump arranged to continuously supply fluid pressure to said motor, a reversing valve arranged to direct table reciprocation, manually operable mechanism independent of said motor arranged to traverse the table, means to control the rate of table reciprocation, and means independent of the reversing valve whereby the table may be manually traversed at any time without disconnecting the flow of fluid pressure to and from the table actuating motor.

8. A machine tool comprising a reciprocable work supporting table, a fluid pressure actuated reciprocatory motor connected to move the table, said motor having a piston therein, a reversing valve having ports communicating with the opposite sides of the piston in said motor and arranged to control the direction of motor movement, said reversing valve also having ports communicating respectively with a fluid pressure source and an exhaust, pistons within the reversing valve which may be moved to cause fluid communication between the ports and produce a table movement in either direction, means to move the reversing valve pistons to such positions that a balanced fluid pressure may be simultaneously applied at both sides of the motor piston to stop the table movement whenever desired and means independent of the reversing valve to by-pass fluid at any time from one side of the motor piston to the other and stop table traverse without reducing normal operating fluid pressure within the motor.

9. A machine tool comprising a reciprocable work table, a fluid pressure actuated motor operatively connected to reciprocate the table, a reversing valve arranged to direct fluid pressure to the motor and cause a table reciprocation, means operated by the table movement to shift the reversing valve to a neutral position and stop the table traverse at a predetermined position, a pilot valve arranged to operate the reversing valve, a lever operably connected with the pilot valve, adjustable means on the table engageable with said lever to cause a reversal of the table actuating motor when the table has reached a predetermined position, a resilient connection between said lever and the pilot valve arranged to absorb any excessive movement of the lever and thereby prevent damaging of the pilot valve, means to manually traverse the table and a manually controllable device in the fluid pressure system independent of the reversing valve arranged to by-pass fluid from one side of the motor to the other so that the table may be manually traversed at any time irrespective of the position of the reversing valve and without disconnecting normal operative fluid pressure from the motor.

10. A machine tool comprising a base, a reciprocable table mounted thereon, a fluid pressure system to reciprocate said table including a cylinder which is fixed to the table, a pair of spaced pistons within said cylinder, a pair of piston rods, one end of each being connected to a piston and the other end of each rod being fixedly connected to said base to maintain the pistons a sufficient distance apart to take care of expansion of the rods, and means including a fluid pressure control valve to convey fluid to the cylinder chambers on opposite ends of the fluid pressure cylinder.

11. A machine tool comprising a base, a reciprocable table mounted thereon, a fluid pressure system to reciprocate said table including a cylinder which is fixed to the table, a pair of spaced pistons within said cylinder, a pair of hollow piston rods, one end of each being connected to a piston and the other end of each rod being fixedly connected to said base to maintain the pistons a sufficient distance apart to take care of expansion of the rods, and means including a fluid pressure control valve to convey fluid through the piston rods to the cylinder chambers on opposite ends of the fluid pressure cylinder.

12. A grinding machine having a work carriage and a grinding wheel base, a fluid motor for operating the work carriage, a valve controlling said motor, a throttle valve, a manually operable start-and-stop valve and a by-pass valve operable with said start-and-stop valve to allow fluid to pass around the throttle valve to permit manual traverse of the work carriage, substantially as set forth.

WALLACE H. WOOD.